Oct. 19, 1965    R. H. RILEY, JR., ETAL    3,212,188
CORDLESS ELECTRIC HEDGE TRIMMER
Filed April 3, 1962    5 Sheets-Sheet 1
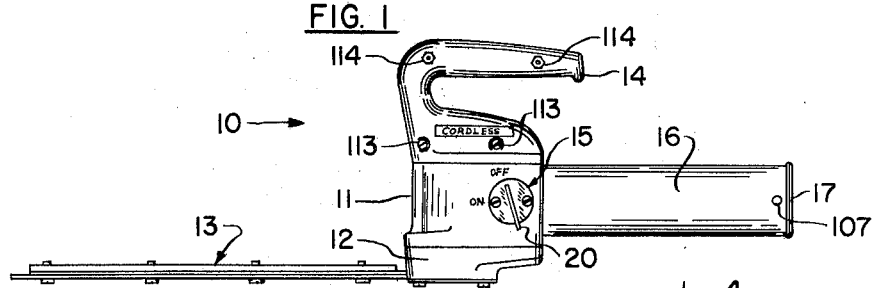
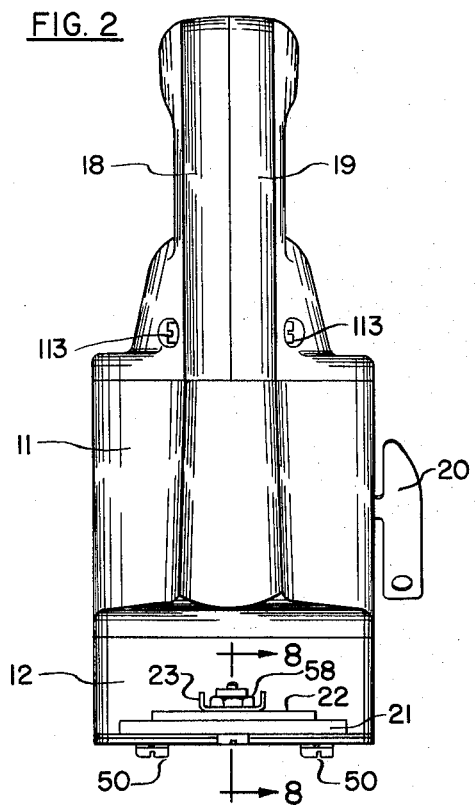
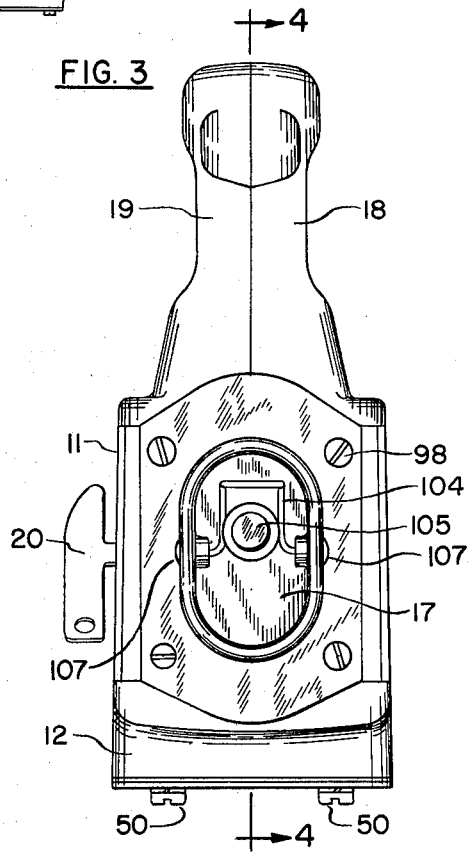
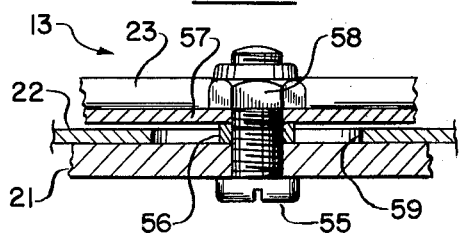
INVENTORS
ROBERT H. RILEY, JR.
MELVIN H. NEUHARDT
HARRY L. BEAM
BY  *Leonard Bloom*
ATTORNEY

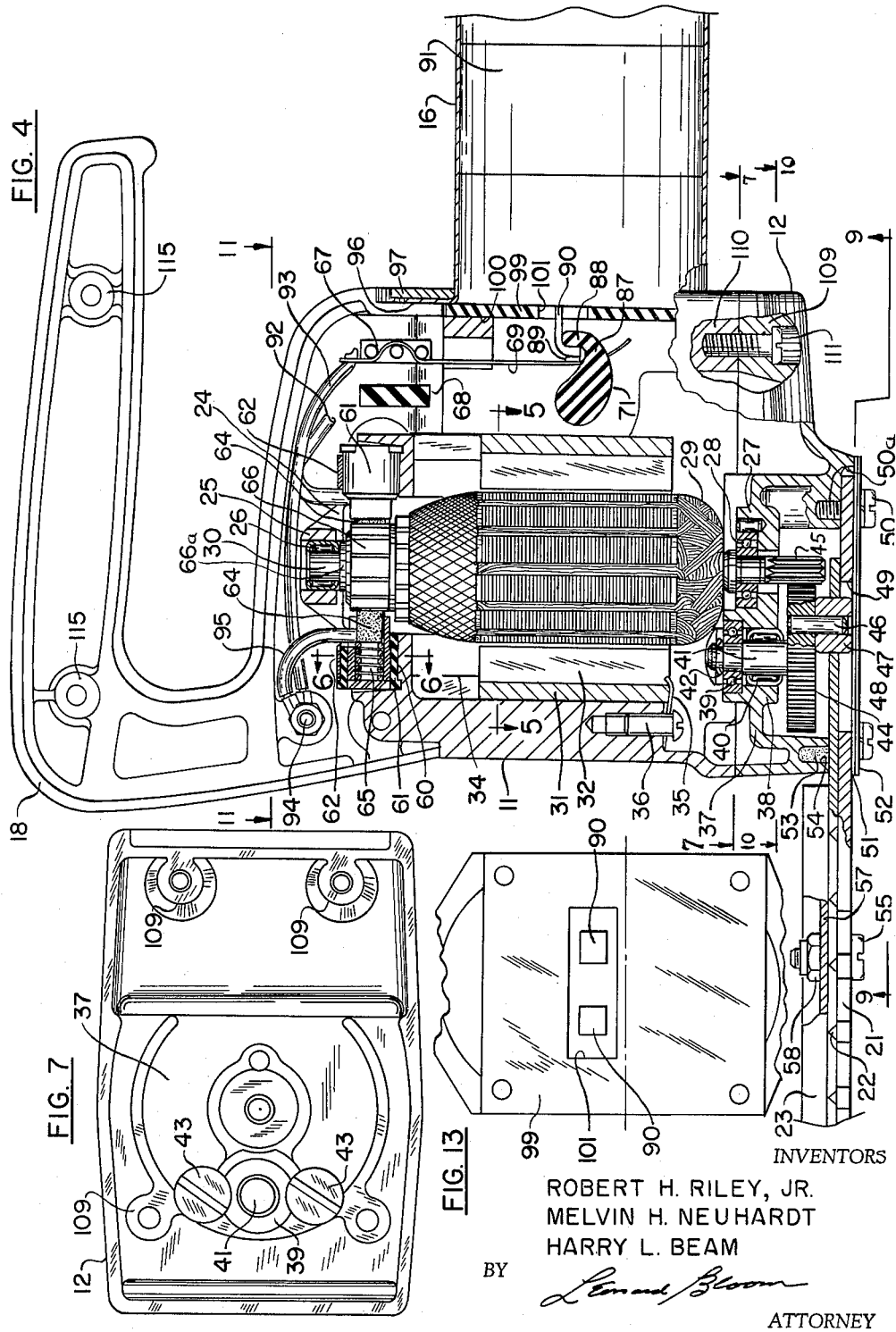

Oct. 19, 1965   R. H. RILEY, JR., ETAL   3,212,188
CORDLESS ELECTRIC HEDGE TRIMMER
Filed April 3, 1962   5 Sheets-Sheet 3
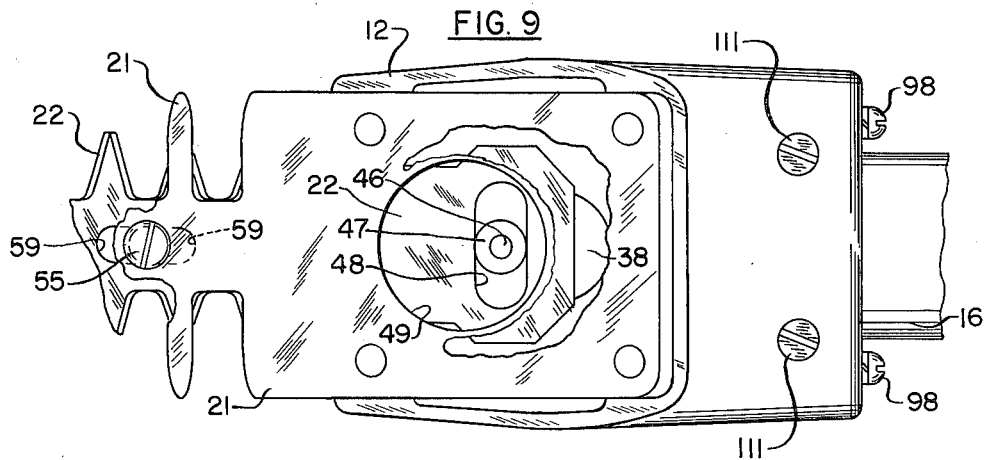
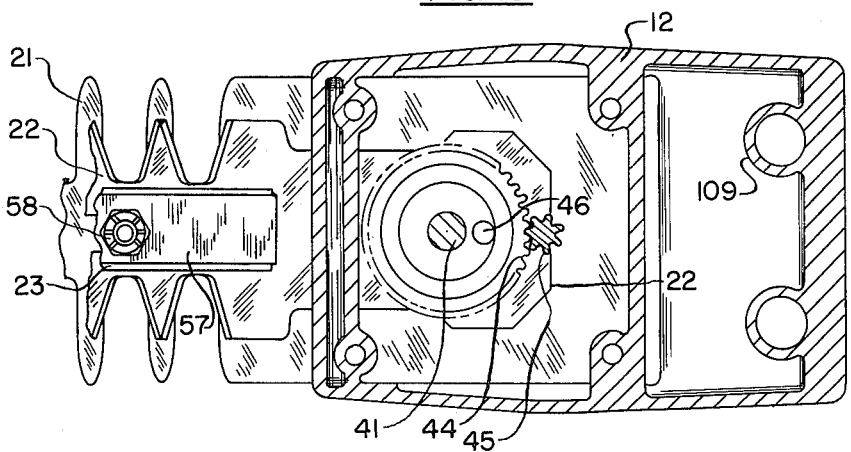
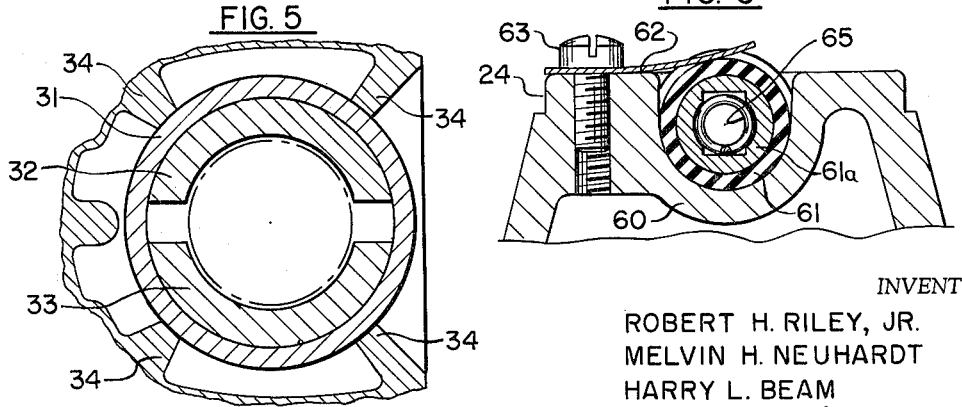
INVENTORS
ROBERT H. RILEY, JR.
MELVIN H. NEUHARDT
HARRY L. BEAM
BY *Leonard Bloom*
ATTORNEY

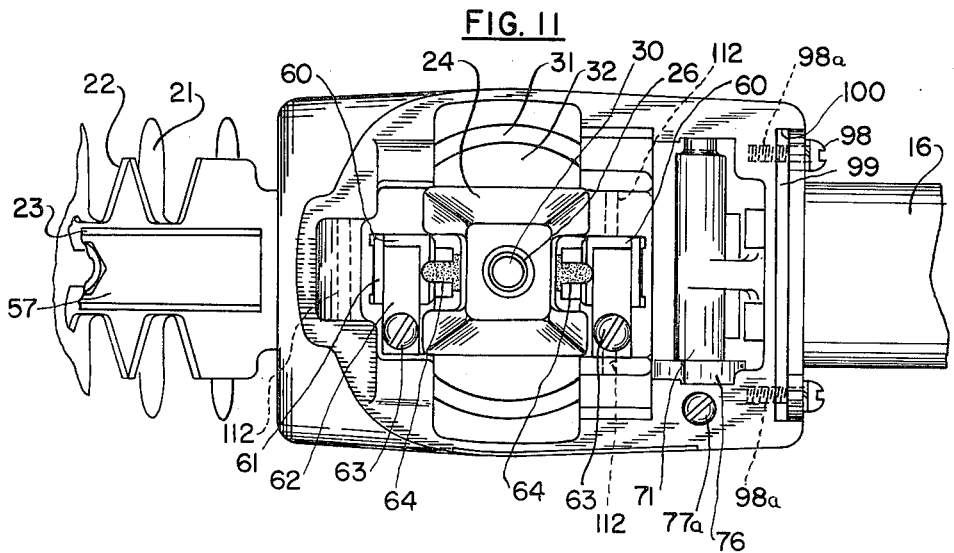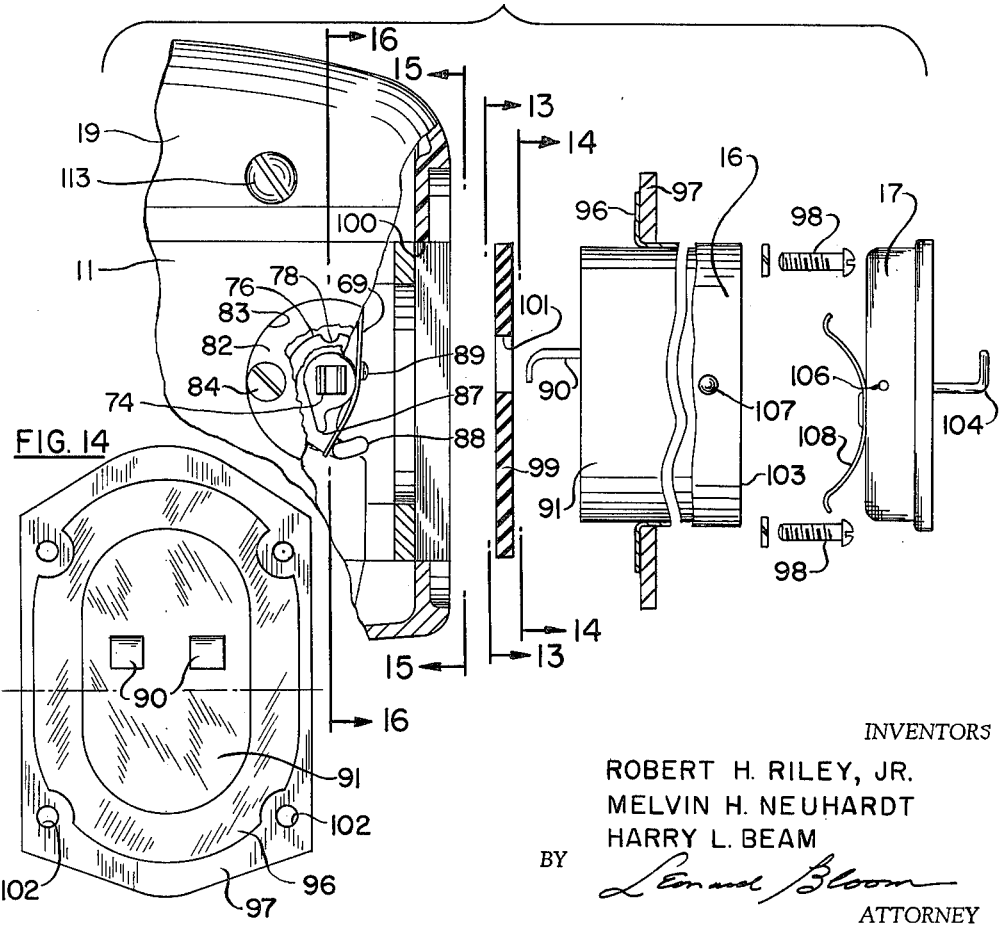

Oct. 19, 1965  R. H. RILEY, JR., ETAL  3,212,188
CORDLESS ELECTRIC HEDGE TRIMMER
Filed April 3, 1962                 5 Sheets-Sheet 5
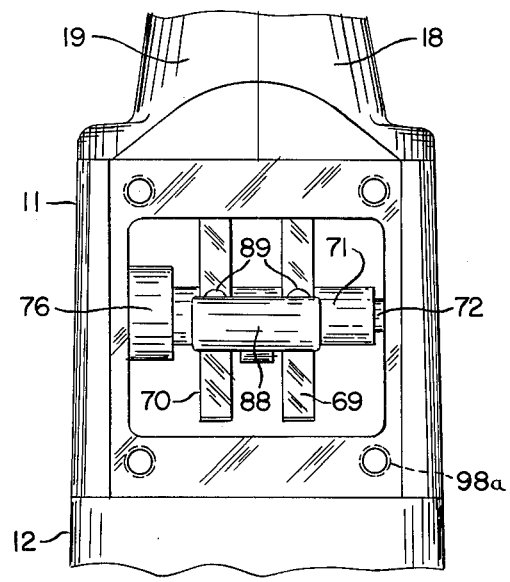
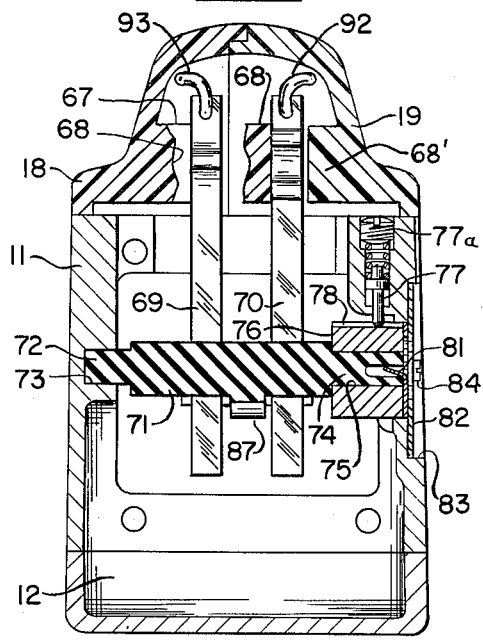
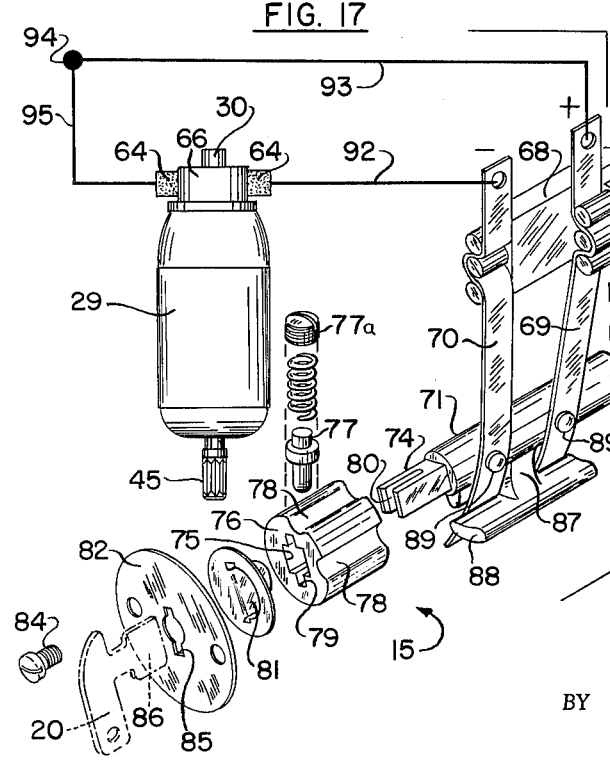
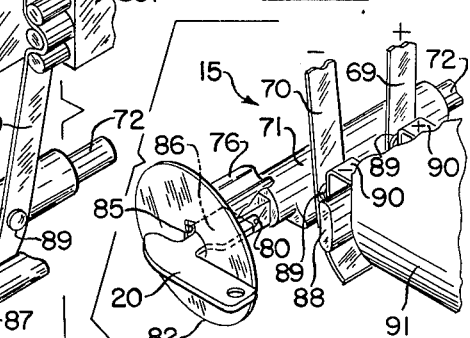
INVENTORS
ROBERT H. RILEY, JR.
MELVIN H. NEUHARDT
HARRY L. BEAM
BY
*Leonard Bloom*
ATTORNEY

United States Patent Office 3,212,188
Patented Oct. 19, 1965

3,212,188
CORDLESS ELECTRIC HEDGE TRIMMER
Robert H. Riley, Jr., Towson, Melvin H. Neuhardt, Baltimore, and Harry L. Beam, Towson, Md., assignors to The Black and Decker Manufacturing Company, Towson, Md., a corporation of Maryland
Filed Apr. 3, 1962, Ser. No. 184,904
5 Claims. (Cl. 30—216)

The present invention relates to a cordless electric hedge trimmer, and more particularly, to such a hedge trimmer that is energized by means of a self-contained battery that is in turn housed within an elongated substantially-hollow housing formed within the hedge trimmer.

In the prior practice of trimming hedges or similar foliage, or in trimming grass located in relatively inaccessible areas, power-driven hedge trimmers or similar devices have been generally utilized. Such hedge trimmers of the prior art have invariably been electrically-operated, with the result that the conventional electric cord, together with one or more extension cords, have been required. From the user's standpoint, however, such electric-driven hedge trimmers of the prior art necessarily involve a number of annoying deficiencies, among which are the following: (1) the electric cord as well as the extension cord interferes with the operator's use and control of the device; (2) the operator must be very careful so as not to cut the cord; (3) if the cord is cut inadvertently, as has been experienced occasionally by a fair proportion of the users, the line may be shorted out and the fuses blown; (4) since the device operates from line current, at approximately 110 volts, or higher, a safety problem is encountered, and the operator must be very careful when working in damp areas where moisture has accumulated on the grass and on the hedges; (5) if the hedges to be cut are fairly remote from the user's house or garage, then a fairly long extension cord is required, with the result that the voltage drop in the extension cord precludes an efficient operation of the electric motor that is contained in the hedge trimmer; and (6) if several extension cords are used, then invariably, the tugs and pulls on the cords encountered in normal usage of the hedge trimmer, will cause the cords to separate from one another, thereby disrupting the usage of the device.

Accordingly, it is an object of the present invention to provide a truly-cordless electric hedge trimmer, one that is energized by means of a self-contained battery.

It is another object of the present invention to provide a cordless electric hedge trimmer that has a slide-out rechargeable battery pack, wherein the battery pack, when discharged, may be readily removed for recharging purposes or else quickly replaced with a spare fully-recharged battery.

It is yet another object of the present invention to provide a cordless electric hedge trimmer that is capable of a sustained operation for a duration of at least one hour, prior to requiring that the battery be replaced with a recharged one.

It is yet still another object of the present invention to provide a cordless electric hedge trimmer, which is fully capable of cutting a hedge that is at least 3 feet high, 3 feet wide, and 200 feet long, prior to requiring that the battery be replaced with a recharged one.

It is a further object of the present invention to provide a cordless electric hedge trimmer that is convenient and easy to use, one whose overall weight, including the battery, compares favorably with respect to the weight of conventional electric hedge trimmers having the usual electric cord.

It is a yet further object of the present invention to provide a cordless electric hedge trimmer having a relatively-low operating voltage, in the order of 6–8 volts, thereby allowing the hedge trimmer to be used under ordinarily hazardous conditions, such as on damp hedges or in wet grass.

It is a yet still further object of the present invention to provide a cordless electric hedge trimmer that will cut virtually all types of conventional hedges and similar foliage, one that will immediately cut a twig or similar growth having a diameter at least as large as that of a standard pencil.

It is again another object of the present invention to provide a cordless electric hedge trimmer having an elongated substantially-hollow housing secured to the motor housing and extending rearwardly therefrom, the housing having an open end remote from the motor housing, in combination with a quick-release cover for the open end, whereby a slide-out battery pack may be quickly removed from the housing and replaced with a recharged battery pack without any appreciable discontinuity in the overall use and operation of the unit.

It is again yet another object of the present invention to provide a cordless electric hedge trimmer having a high-efficiency direct current electric motor, which comprises a permanent field assembly including a pair of oppositely-disposed permanently-magnetic tubular segments, in combination with a wound laminated armature rotating between the segments.

It is again yet still another object of the present invention to provide a cordless electric hedge trimmer, whereby the operator is completely free, is not hampered by extension cords or portable generators, and whereby there are no cords to plug in, trip over, or cut.

It is again a further object of the present invention to provide a cordless electric hedge trimmer having a key-type locking switch, whereby the slide-out battery pack cannot be removed from the unit whenever the switch is in the "on" position, and whereby should the battery pack be removed from the unit and the switch moved from its "off" position to its "on" position in the interim, then the battery pack may not be reinserted within the unit to make contact so long as the switch remains in its "on" position.

It is again a yet further object of the present invention to provide a cordless electric hedge trimmer that is rugged and reliable, one that is unusually safe to operate, and one that is efficient and powerful and relatively quiet in its operation.

It is again a yet still further object of the present invention to provide a cordless electric hedge trimmer that may be manufactured easily and conveniently, one that requires a minimum of assembly time, so as to facilitate an economical high-speed mass production.

Accordingly, there is illustrated herein a preferred embodiment of the cordless electric hedge trimmer, one that was made in accordance with the teachings of the present invention, and including a motor housing, a gear case secured to the motor housing, and an elongated substantially-hollow housing secured to the motor housing and extending rearwardly therefrom. A removable battery is housed in the elongated housing; and preferably, but not necessarily, the battery comprises a slide-out battery pack having a series of interconnected rechargeable energy cells. The battery has a pair of terminals which protrude partially within the motor housing, and means are provided to insure that the battery will always be inserted properly and oriented correctly within the elongated housing. A high-efficiency direct current electric motor is housed in the motor housing. Preferably, but not necessarily, the motor comprises a permanent magnetic field in combination with a wound laminated armature rotating within the field. High-conductivity electrical connection means are provided to couple the armature to the battery terminals. A manually-manipulated switch is included in the electrical connection means, and means are further provided to prevent the battery from being removed so long as the switch is in its "on" position. A blade assembly is provided. The blade assembly includes at least one reciprocating blade that is retained within the gear case and projects forwardly therefrom in substantial alignment with the rearward elongated housing, and motion-translating means are provided within the gear case so as to mechanically couple the armature to the reciprocating blade.

These and other objects of the present invention will become apparent from the reading of the following specification, taken in conjunction with the enclosed drawings, in which:

FIGURE 1 is a side elevation of the overall assembly of the cordless electric hedge trimmer of the present invention, the device being in its "off" position;

FIGURE 2 is an enlarged front elevation looking into the blade assembly, showing the split-casing overhead handle, and further showing the switch-actuating locking key inserted within the motor housing;

FIGURE 3 is an enlarged rear elevation, showing the quick-release cover means positioned on the open end of the elongated housing, the cover means allowing the slide-out battery pack to be quickly removed from the unit;

FIGURE 4 is an enlarged section taken along the lines 4—4 of FIGURE 3, the elongated rearward housing and the blade assembly being shown only partially for convenience of illustration, and the unit being in its "on" position;

FIGURE 5 is a section taken along the lines 5—5 of FIGURE 4, showing the formation of the permanent magnetic field, with the armature being illustrated in broken lines for convenience of illustration;

FIGURE 6 is a section taken along the lines 6—6 of FIGURE 4, showing one of the U-shaped recesses formed in the upper bridge portion of the motor housing to receive one of the brushholders;

FIGURE 7 is a section taken along the lines 7—7 of FIGURE 4, looking down on the top of the gear case, and showing the bearing bosses formed therein;

FIGURE 8 is a section taken along the lines 8—8 of FIGURE 2, showing the construction of the blade assembly;

FIGURE 9 is a view taken along the lines 9—9 of FIGURE 4, showing the transverse yoke formed within the movable blade so as to translate the rotary motion of the armature shaft into the reciprocating motion of the movable blade;

FIGURE 10 is a section taken along the lines 10—10 of FIGURE 4, showing the armature pinion meshing with the single-reduction spur gear which is journaled on a stub shaft, and further showing in plan view the channel member for retaining the movable blade and guiding it with respect to the stationary blade;

FIGURE 11 is a view taken along the lines 11—11 of FIGURE 4, showing the upper bridge portion of the motor housing in plan view, the overhead handle as well as the electrical connections being removed for convenience of illustration;

FIGURE 12 is an exploded view showing in elevation the rearward part of the motor housing with the switch in the "off" position, a portion of the slide-out battery pack, a portion of the elongated housing for the battery pack, and the quick-release cover means for the end of the elongated housing;

FIGURE 13 is a view taken along the lines 13—13 of FIGURE 12, showing in plan view the insulating board that is retained between the elongated housing and the motor housing, and further showing the offset opening in the insulating board through which the battery terminals protrude;

FIGURE 14 is a view taken along the lines 14—14 of FIGURE 12, showing the flange portion of the elongated housing, and further showing the offset relationship between the battery terminals and a horizontal center line of the battery pack;

FIGURE 15 is a view taken along the lines 15—15 of FIGURE 12, looking forwardly into the rear portion of the motor housing, the switch now being back in the "on" position;

FIGURE 16 is a section taken along the lines 16—16 of FIGURE 12, looking rearwardly towards the elongated housing, and showing the manually-manipulatable key-type locking switch again in the "on" position;

FIGURE 17 is a schematic view of the electrical interconnection, showing the components of the locking switch in exploded view, the switch being in the "off" position, and further showing the movable contacts and the battery terminals in perspective; and FIGURE 18 is a view corresponding to a portion of FIGURE 17, but showing the switch in its "on" position with the locking key retained therein.

With reference to FIGURES 1, 2, 3 and 4, there is illustrated the cordless electric hedge trimmer 10 of the present invention, which includes a motor housing 11, a gear case 12 secured below the motor housing 11, a blade assembly 13 retained within the gear case 12 and projecting forwardly therefrom on the front of the hedge trimmer 10, an overhead handle 14, a manually-manipulatable key-type locking switch 15, an elongated substantially-hollow housing 16 secured to the motor housing 11 and projecting rearwardly therefrom, and a quick-release cover member 17 fitted on the end of the housing 16. The overhead handle 14 is of the split-casing type and includes a pair of complementary mating halves, comprising a bottom half 18 and a top half 19 joining together at the common longitudinal midplane of the hedge trimmer 10. Preferably, but not necessarily, the motor housing 11 and the gear case 12 are formed from die-cast aluminum, while the mating halves 18 and 19 of the overhead handle 14 are molded from a suitable plastic material. The locking switch 15 includes a key 20, which is adapted to be inserted within the switch 15 to actuate the unit in a manner hereinafter to be described in detail. The blade assembly 13, which is of the double-edged type, includes a stationary blade 21 and a movable blade 22. The movable blade 22 is guided for reciprocation with respect to the stationary blade 21 by means which includes a channel 23.

With reference to FIGURES 4, 5, 7, and 11, the motor housing 11 has an upper bridge portion 24, which includes a bearing boss 25 formed therein. A bearing 26, preferably of the needle type, is retained within the boss 25. The gear case 12 includes a bearing boss 27, and a suitable bearing 28 is retained therein. An armature 29 has a armature shaft 30, which is journaled in the respective bearings 26 and 28. The armature is of the wound laminated type and includes a total of 12 winding slots, within each of which there are 10 conductors of No. 18 wire. A permanent magnetic field is retained within the motor housing 11. The field assembly, as shown more particularly in FIGURE 5, includes an outer concentric sleeve 31 and a pair of permanently-magnetic tubular segments 32 and 33 retained within the sleeve 31 by adhesive or other suitable means. The segments 32 and 33 are dimensionally identical to each other and are oppositely-disposed from one another. Accordingly, it will be appreciated by one skilled in the art that the combination of the wound laminated armature 29, together with the permanent magnetic field assembly, comprises a high-efficiency direct current electric motor; and the details of the motor construction, together with the design philosophy inherent therein, are provided in the co-pending Riley et al. application Ser. No. 156,625, filed December 4, 1961, entitled "Cordless Electric Device Having High-Efficiency Direct Current Electric Motor Utilizing Permanently-Magnetic Tubular Segments," and assigned to the same assignee as that of the present invention. The field assembly is inserted within the motor housing 11, prior to the assembly of the gear case 12 to the motor housing 11, and shoulders against four circumferentially-spaced internal lands, one of which is shown as at 34; and a clamp 35, which is secured to the motor housing 11 by means of a screw 36, then retains the field assembly within the motor housing 11.

With reference again to FIGURES 4 and 7, and with further reference to FIGURE 9, the gear case 12 has a transverse wall 37, within which the aforementioned bearing boss 27 is located. The transverse wall 37 further has a second bearing boss 38 formed therein. The bosses 27 and 38 are aligned with each other along the common longitudinal midplane of the hedge trimmer 10. The bearing boss 38 has a ball bearing 39 and a needle bearing 40 retained therein. A stub shaft 41 is journaled within the bearings 39 and 40 and projects interiorly of the motor housing 11. The stub shaft 41 carries a snap ring 42, and a pair of cap screws 43 are received within the transverse wall 37 (see FIGURE 7) to retain the ball bearing 39. The stub shaft 41 carries a single-reduction spur gear 44, which meshes with a pinion 45 formed on the end of the armature shaft 30. The spindle gear 44 carries an eccentric pin 46, and a bearing or roller 47 is carried on the end of the eccentric pin 46. The roller 47 is guided within a transverse yoke 48 formed on the movable blade 22, as shown more particularly in FIGURE 9. A suitable clearance hole 49 is formed within the stationary blade 21 to accommodate the movement of the roller 47. The stationary blade 21 is secured within the gear case 12 by means of four screws 50, which are received in corresponding threaded bosses 50a formed in the gear case 12; and a grease seal 51 and cover plate 52 are interposed between the gear case 12 and the stationary blade 21. Moreover, a transverse grease seal 53 is received within a slotted recess 54 formed in the front portion of the gear case 12. The grease seal 53 wipes against the top of the moving blade 22, thereby preventing any grease or oil from emerging from the gear case 12 and running along the blade assembly 13. Furthermore, the gear case 12 has a plurality of bosses 109 which are aligned with tapped bosses 110 formed in the motor housing 11, and a plurality of screws 111 pass through the bosses 109 and 110 to secure the gear case 12 to the motor housing 11.

With reference again to FIGURES 1, 2, 4, and 9, the stationary blade 21 carries a plurality of mounting screws 55; and a plurality of spacer washers 56 are provided, one for each of the screws 55. The washers 56 are interposed between the stationary blade 21 and the bottom or trough 57 of the channel 23. The channel 23 is secured to the stationary blade 21 by means of respective lock nuts 58, which engage the mounting screws 55. The spacer washers 56 have a slightly greater thickness than the corresponding thickness of the movable blade 22; and the movable blade 22 has a plurality of longitudinal guide slots 59 formed therein, as shown more particularly in FIGURE 9. Consequently, the movable blade 22 is guided for limited reciprocation with respect to the stationary blade 21. Preferably, the movable blade 22 is formed from carbon spring steel and is cadmium plated all over, while the stationary blade 21, which is also formed from carbon spring steel, is provided with a hard-finished chromium plate all over. The channel 23 is formed from cold rolled steel and is cadmium-plated. Moreover, the underside of the channel 23, as well as the top surface of the stationary blade 21, and both surfaces of the movable blade 22, are provided with a dry lubricant, preferably of the type which is applied in the form of a spray. Consequently, the blade assembly 13 is corrosion-resistant, while reducing friction, to insure a free and easy reciprocation of the movable blade 22. Preferably, an oil-based lubricant should be avoided, inasmuch as soil particles and grit will adhere to the oil, thus detracting from the free and easy reciprocation of the movable blade 22.

With reference again to FIGURES 4, 6 and 11, the upper bridge portion 24 of the motor housing 11 has a pair of substantially U-shaped recesses 60 formed therein, one on each side of the bearing boss 25. A suitable insulated brushholder 61 is received within each of the respective recesses 60, and each of the brushholders 61 has a metallic insert 61a received therein. The brushholders 61 are retained in recesses 60 by means of clamp tabs 62, which are secured to the bridge portion 24 by means of screws 63. A high-conductivity electrical brush 64 is slidably guided within each of the brushholders 61. The brushes 64 are formed from a silver-graphite or other suitable composition. The brushes 64 are urged inwardly of the motor housing 11 by means of springs 65 so as to engage a commutator 66 carried by the armature shaft 30. Moreover, a washer 66a is interposed between the commutator 66 and the bearing 26.

With reference again to FIGURES 4 and 11, and with further reference to FIGURES 15, 16, 17, and 18, the bottom half 18 of the overhead handle 14 includes a pair of insulated spaced-apart contact supports 67 and 68, which are parallel to each other. Support 67 terminates short of the common longitudinal midplane of the hedge trimmer 10, while its companion insulated support 68 projects slightly beyond the longitudinal midplane, as shown more particularly in FIGURE 16. A pair of movable contacts comprising a positive contact 69 and a negative contact 70 are carried by the supports 67 and 68, respectively. The top half 19 also has a pair of parallel fins, one of which is shown as at 68' in FIGURE 16, so as to trap the movable contacts 69 and 70 when the halves 18 and 19 are secured together. The movable contacts 69 and 70 are formed from a strip of suitable resilient material, such as beryllium copper. The lower ends of the movable contacts 69 and 70 are engaged by an insulated pin member 71, which may be molded from a suitable material. The member 71 is retained transversely within the motor housing 11 and is adapted to have a limited rotation (on its axis) through an angle of approximately 75°. As shown more clearly in FIGURE 16, the member 71 has an end portion 72 which is journaled within a hole 73 formed within the motor housing 11. The opposite end 74 of the member 71 is received within a collar 76. The end 74 of the member 71 has a substantially rectangular cross-section so as to cooperate with a through recess 75 formed within collar 76, the recess 75 having a rectangular cross-section as shown more clearly in FIGURE 17. Consequently, the collar 76 and the pin member 71 are coupled together for rotation in unison. A spring-loaded detent 77 is retained within the motor housing 11 by means of a screw 77a. The detent 77 is adapted to engage within either of a pair of longitudinal recesses 78 formed externally on the collar 76, thus providing a "snap action" to the movement of pin member 71. The collar 76 further has a blind slotted recess 79 formed therein and communicating with the through recess 75, while the end portion 74 of the member 71 has a complementary slot 80 formed therein. A member having a spring tang 81 is received within the slotted recess 79 and the complementary slot 80. A cover piece 82 is received within a circular recess 83 formed externally on the motor housing 11 and is secured therein by means of screws 84. The cover piece 82 has a slot 85 formed therein to mutually cooperate with the slotted recess 79 in the collar 76 as well as the complementary slot 80 formed in the pin member 71. The key 20 has a key portion 86 which is adapted to be inserted through the slot 85 in the cover piece 82 and to be received within the slotted recess 79 and slot 80. The spring tang 81 is adapted to engage the key portion 86 of the key 20, thereby spring-loading the key 20 and maintaining a firm mechanical rigidity whenever the key 20 is inserted and rotated to actuate the hedge trimmer 10. In the "off" position of the switch, as illustrated in FIGURE 17, the slot 85 in the stationary cover piece 82 is aligned with the cooperating slotted recess 79 and slot 80 formed, respectively, in the collar 76 and pin member 71. Consequently, the key 20 may be inserted so that the key portion 86 thereof is received within the slotted recess 79 and cooperating slot 80; and thereafter, the key 20 may be turned or rotated through an angle, in the order of 75 degrees, so as to move the switch from its "off" position to its "on" position. Moreover, with the switch in the "on" position, the cover piece 82 prevents a removal of the key 20 as shown in FIGURE 18.

Consequently, a safety feature is provided. The hedge trimmer 10 may not be turned "on" accidentally. The switch for turning the unit "on" includes the key 20. The key 20 must first be inserted in the hedge trimmer 10 to start the unit. Then, when the hedge trimmer 10 is "on," as in FIGURE 18, the key 20 may not be removed from the unit. The switch must first be moved to its "off" position, so as to first de-activate the hedge trimmer 10. Then, the key portion 86 of the key 20 is aligned with the slot 85 in the stationary cover piece 82, thereby allowing the key 20 to be removed.

With further reference to FIGURES 4, 11, 15, 16, 17, and 18, the pin member 71 has a transverse cam arm 87 formed intermediate the ends thereof, and the transverse arm 87 has an integral locking arm 88 running parallel to the axis of the pin member 71. The ends of the movable contacts 69 and 70 are interposed between the locking arm 88 and the pin member 71, on respective sides of the transverse cam arm 87. A pair of high-conductivity rearwardly-facing contact buttons 89 are secured to the movable contacts 69 and 70 near the ends thereof. The buttons 89 are formed preferably from a high-conductivity material, such as a silver-cadmium oxide alloy. Respective L-shaped battery terminals 90 are formed on the top portion of the slide-out battery pack 91. The battery pack 91 comprises a series of inter-connected rechargeable energy cells, which may be formed from nickel-cadmium or other suitable materials. Moreover, the battery pack 91 is snugly housed within the elongated rearward housing 16, which has a generally oval cross-sectional outline; consequently, the housing 16 may be conveniently grasped by the operator. The battery terminals 90 comprise a positive terminal and a negative terminal, which are adapted to engage the contact buttons 89 of the movable contacts 69 and 70, respectively, to energize the hedge trimmer 10. A lead 92 connects the movable positive contact 69 with one of the brushes 64. Another lead 93 connects the other or negative movable contact 70 with a terminal post 94. Finally, a third lead 95 connects the terminal post 94 with the other one of the brushes 64.

Accordingly, when the switch is placed in its "on" position, that is to say, when the pin member 71 is turned through an angle of approximately 75° from its "off" position (of FIGURE 17) to its "on" position, as in FIGURE 18, the locking arm 88 of the pin member 71 moves the cantilevered lower portions of the movable contacts 69 and 70 rearwardly within the motor housing 11, such that the respective contact buttons 89 engage the respective battery terminals 90; and thus, the battery pack 91 is placed in series with the brushes 64, which engage the commutator 66 of the motor, thereby energizing the motor and actuating the blade assembly 13. Moreover, as shown more clearly in FIGURE 4, the locking arm 88 is received underneath of the L-shaped battery terminals 90, thereby precluding removal of the battery pack 91 so long as the hedge trimmer 10 is in the "on" position. Conversely, it will be understood that if the battery pack 91 is already removed from the hedge trimmer 10, and then the switch is moved to its "on" position, that the locking arm 88 will then abut against the top face of the L-shaped battery terminals 90, thereby precluding the battery pack 91 from being properly inserted within the motor housing 11. An additional safety feature is thus provided. If the battery pack 91 has been removed, and the switch has been inadvertently turned "on" in the interim period, the insertion of the battery pack 91 will have an innocuous effect, inasmuch as the insulated locking arm 88 will abut against the battery terminals 90 and preclude their engagement with the contact buttons 89.

With reference again to FIGURES 4 and 12, and with reference to FIGURES 13 and 14, the upper (or inner) portion of the elongated housing 16 has a flange 96 to which another flange 97 is secured. The housing 16 is secured to the rear of the motor housing 11 by means of a plurality of screws 98, which pass through holes 102 in the flange 97, and which are received within corresponding threaded recesses 98a formed in the rear portion of the motor housing 11. Moreover, an insulated board 99 is received within a recess 100 formed in the motor housing 11 and is retained therein when the elongated housing 16 is secured to the motor housing 11. The board 99 has an opening 101 formed therein. The opening 101 is offset (see FIGURE 13) from the horizontal center line of the board 99. Similarly, the battery terminals 90 of the battery pack 91 are likewise offset with respect to the horizontal center line or horizontal plane of the battery pack 91, and by an amount which is approximately equal to the offset of the opening 101 within the board 99. Consequently, it will be appreciated that the offset opening 101, in combination with the offset battery terminals 90, properly orientate the position of the battery pack 91 within the elongated housing 16, thereby insuring the proper electrical polarity and precluding the slide-out battery pack 91 from being reversely inserted within the housing 16.

With further reference to FIGURES 1, 3, 4, and 12, the elongated housing has an open end 103, which is remote from the motor housing 11. The slide-out battery pack 91 is adapted to be inserted through the open end 103 of the elongated housing 16 and to be retained therein by the cover member 17. Preferably, the cover member 17 is of the quick-release type so as to facilitate a rapid removal of the slide-out battery pack 91. The cover member 17 includes a manually-manipulatable locking spring 104 which engages a stationary locking post 105 so as to cam a pair of feet (on the locking spring 104) into engagement with a pair of respective dimpled recesses formed in the elongated housing 16 near the open end 103. One of the feet is shown in end elevation as at 106 in FIGURE 12, while its respective dimpled recess is shown as at 107. Moreover, the cover member 71 carries a leaf spring 108, or other resilient means, which is adapted to engage the bottom of the battery pack 91. Thus the battery pack 91 is spring-loaded within the elongated housing 16 so as to insure good electrical contact together with firm mechanical rigidity. The quick-release cover member 17 is the subject of the co-pending Riley et al. application Ser. No. 177,467, filed March 5, 1962, entitled "End Portion Construction for Handle of Cordless Electric Device Having a Slide-Out Battery Pack," and assigned to the same assignee as that of the present invention.

With reference again to FIGURES 1, 2, 3, and 4, the upper bridge portion 24 of the motor housing 11 has a pair of transverse tapped recesess 112 on each side of the bridge portion 24, and the complementary halves 18 and 19 are each secured to the bridge portion 24 by means of screws 113, which are received in the tapped recesses 112. Moreover, the halves 18 and 19 of the overhead handle 13 are secured to each other by screw and bolts sets 114, which pass through the bosses 115.

The hedge trimmer 10 may be used by the operator placing one hand on the overhead handle 14 and his other hand around the elongated housing 16 for easy control over the device. Moreover, for hedges which are very wide, or quite high, the operator may place both of his hands on the housing 16 and use the hedge trimmer 10 in a sweeping manner, it being noted that the blade assembly 13 is doubled-edged to accommodate a sweeping back-and-forth movement of the hedge trimmer 10.

In summary, it is seen that the present invention fulfills the stated objects by providing a truly-cordless electric hedge trimmer, one that is capable of cutting a normal hedge having a length of about 200 feet and a total area of around 1300 square feet, prior to requiring that a fresh or recharged battery pack be inserted. This constitutes about a full hour of continuous cutting, which is more than adequate for most applications. Moreover, the battery pack 91 is readily removable, and in a matter of seconds, it may be replaced with a spare battery pack that has already been recharged. There is thus no appreciable disruption of the cutting operation; and the job may be continued while the depleted battery pack is being recharged. The battery pack 91, in one commercial embodiment thereof, may be recharged a minimum of 400 times prior to being discarded. There are 5 cells in the present embodiment of the battery pack 91, and as hereinabove stated, the cells are nickel-cadmium, having a minimum capacity of 4 ampere hours at approximately 6½ volts. This low operating voltage makes the hedge trimmer 10 completely shockproof, even under conditions that would ordinarily be considered as hazardous. The direct current motor is highly-efficient and is manufactured to precise tolerances, and the motor cannot be harmed by overloading or stalling. Moreover, the low-friction precision bearings of the ball or needle type, which have been used throughout, contribute to an even and low-loss transmission of power with very little vibration. The blade assembly 13 has teeth on both sides, so that the hedge trimmer 10 cuts either to the left or to the right in a sweeping motion. Moreover, the processing and treatment of the blade assembly 13 is designed to reduce friction, yet prevent any clogging or rusting. The hedge trimmer 10 is well-balanced for ease of operation, and the commercial embodiment thereof weighs only 6½ pounds complete with battery pack. Moreover, the hedge trimmer 10 is unusually quiet, while the various housings are totally enclosed to protect the working components from dirt or grit. The starting switch includes the key 20, which prevents accidents by precluding the unit from being turned "on" inadvertently, as for example, while the user is holding the blade assembly 13. Moreover, with the switch in the "on" position, the battery pack 91 may not be removed, which is an additional safety measure.

Obviously, many modifications may be made without departing from the basic spirit of the present invention; and accordingly, it will be appreciated that within the scope of the appended claims, the invention may be practiced other than has been specifically described.

We claim:
1. A cordless electric hedge trimmer, comprising:
  (a) a motor housing;
  (b) a direct current electric motor in said motor housing;
  (c) a gear case secured to said motor housing;
  (d) a blade assembly including at least one reciprocating blade retained within said gear case and projecting forwardly therefrom;
  (e) motion-translating means in said gear case and coupling said reciprocating blade to said motor;
  (f) an elongated substantially-hollow housing secured to said motor housing and projecting rearwardly therefrom, whereby said housing and said blade assembly are aligned with each other along a common longitudinal midplane;
  (g) a removable battery in said elongated housing; and
  (h) electrical means between said battery and said motors;
  (i) said means including a manually-manipulatable key-type locking switch carried by said motor housing and disposed between said motor and said battery.

2. A cordless electric hedge trimmer, comprising:
  (a) a motor housing;
  (b) an overhead handle secured to said motor housing;
  (c) an elongated substantially-hollow housing secured to said motor housing and projecting rearwardly therefrom;
  (d) a slide-out battery within said elongated rearward housing;
  (e) said elongated housing having an open end remote from said motor housing, whereby said slide-out battery may be inserted within said elongated housing;
  (f) quick-release cam actuated cover means for said open end of said elongated housing;
  (g) a direct current electric motor in said motor housing;
  (h) electrical connection means from said battery to said motor;
  (i) said electrical means including manually-manipulatable switch means carried by said motor housing;
  (j) a gear case secured below said motor housing;
  (k) a stationary blade secured within said gear case and projecting therefrom forwardly of the hedge trimmer and in substantial longitudinal alignment with said elongated rearward housing;
  (l) a movable blade disposed above and parallel to said stationary blade and being guided for reciprocation with respect to said stationary blade; and
  (m) motion-translating means in said gear case and coupling said motor to said movable blade.

3. A cordless electric hedge trimmer as described in claim 2, wherein said overhead handle is split longitudinally and comprises:
  (a) a pair of complementary mating halves including a bottom half and a top half joining together along a common longitudinal midplane, each of said halves being secured to said motor housing and to each other;
  (b) said bottom half having a pair of internal spaced-apart parallel contact supports, each of which is insulated, and each of which is formed transversely of the longitudinal midplane;
  (c) one of said insulated contact supports terminating short of the longitudinal midplane, and the other of said insulated contact supports extending beyond the midplane;
  (d) said electrical connecting means including a pair of cantilevered movable contacts supported at one end by said respective insulated contact supports and engaged by said switch means; and
  (e) insulated means carried by said top half of said overhead handle for retaining said movable contacts.

4. A cordless electric hedge trimmer as described in claim 2, wherein:
  (a) an insulated board is retained between said motor housing and said elongated rearward housing for said battery;
  (b) said battery having a pair of L-shaped terminals offset with respect to a center line of said battery; and
  (c) said insulated board having a pair of openings through which said battery terminals may protrude;
  (d) said openings being offset with respect to a center line of said board corresponding to the center line of said battery from which said battery terminals are offset, and by a substantially equal amount, whereby the position of said battery within said elongated rearward housing may be properly oriented.

5. A cordless electrical device for trimming or cutting hedges, foliage and other growth, comprising:
  (a) a motor housing;

(b) a direct current electric motor in said housing;
(c) a battery housing secured to said motor housing and projecting therefrom;
(d) a battery within said battery housing;
(e) said battery having a top portion formed with a pair of terminals received in said motor housing; said terminals being offset with respect to a center line of said top portion of said battery;
(f) means to orient the position of said battery within said battery housing, whereby said battery terminals are received in said motor housing in only one position;
(g) said last-named means including an insulating member retained between said motor housing and said battery housing with offset openings formed therein to receive said battery terminals; said openings being offset from a corresponding center line by an amount which is substantially the same as the amount by which said battery terminals are offset, and in the same direction;
(h) electrical connection means including a manually-manipulatable switch between said battery terminals and said motor;
(i) a reciprocating blade; and
(j) means to drive said blade from said motor.

References Cited by the Examiner

UNITED STATES PATENTS

| | | | |
|---|---|---|---|
| 2,040,683 | 5/36 | Biniek | 30—45 |
| 2,268,221 | 12/41 | Mischker | 30—216 |
| 2,301,147 | 11/47 | Schaaf et al. | 30—45 |
| 2,575,038 | 11/51 | Banka | 30—216 |
| 3,079,510 | 2/63 | Hartwig | 30—45 X |
| 3,083,457 | 4/63 | Ottosen et al. | 30—216 |

WILLIAM FELDMAN, *Primary Examiner.*

EDWARD V. BENHAM, *Examiner.*